No. 649,510. Patented May 15, 1900.
C. FREDRICKS.
FISH HOOK.
(Application filed Aug. 1, 1899.)
(No Model.)

WITNESSES:
D. N. Nayward
David T. Rode

INVENTOR
Charles Fredricks
BY
Clarence Rupert
ATTORNEY

UNITED STATES PATENT OFFICE.

CHARLES FREDRICKS, OF NEW YORK, N. Y.

FISH-HOOK.

SPECIFICATION forming part of Letters Patent No. 649,510, dated May 15, 1900.

Application filed August 1, 1899. Serial No. 725,741. (No model.)

*To all whom it may concern:*

Be it known that I, CHARLES FREDRICKS, a citizen of the United States, residing in the borough of Brooklyn, city of New York, county of Kings, and State of New York, have invented a new and useful Improvement in Fish-Hooks; and I do hereby declare that the following is a full, clear, and exact description of the same.

My invention relates to the general class of fish-hooks in which two hooks are jointed together medially, with their barbs projecting laterally in opposite directions and their eyes connected loosely by a loop on the fish-line, so that when a fish seizes the hooks and the fish-line is pulled the tension on the line will draw the eyes of the hooks together, and thus spread the barbs in the mouth of the fish, so as to catch him securely.

The principal objects of my improvement are to provide for baiting either or both hooks independently and to furnish simple and convenient means for setting the hooks in their proper normal position of rest.

To these ends the invention consists, first, in pivoting or jointing the hooks together so that they can swing relatively to each other not only transversely, but crosswise, so that the small fish or bait on the one hook will not interfere with the other; secondly, in connecting the lower arm of one hook with the eye or upper arm of the other hook by a light rubber cord, which automatically draws and sets the two hooks in their proper position of rest, determined by the loop on the fish-line, and yet permits the hooks when seized by the fish to be easily spread by said loop reeving through the two eyes on the hooks.

In order that my invention may be fully understood, I shall first describe the invention in detail and then particularly claim the same.

Reference is to be had to the accompanying drawings, forming part of this specification, in which the same parts are designated by like numbers in all the figures.

Figure 1:
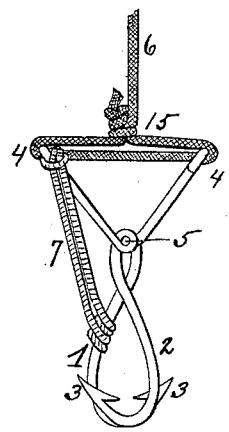
Figure 3:
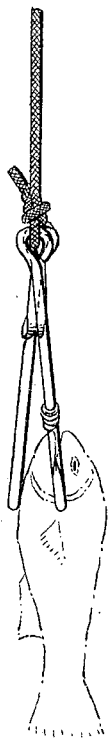
Figure 2:
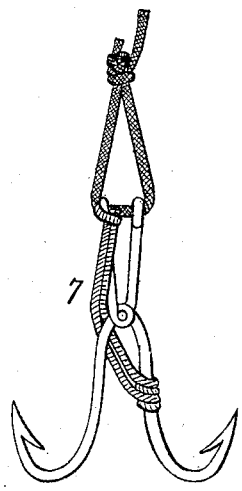

Figure 1 is a side view of my improved fish-hook when set for action. Fig. 2 is a similar view showing the individual hooks spread apart edgewise or transversely. Fig. 3 is an edge view showing the individual hooks spread crosswise to accommodate the bait.

I make my fish-hook of two individual hooks 1 and 2, having barbs 3 and eyes 4, jointed together medially by a loose pin or rivet 5, so that the hooks 1 and 2 can spread apart edgewise, as shown in Fig. 2, and also crosswise, as shown in Fig. 3. This enables each hook to be baited independently of the other, as indicated in Fig. 3, and effectually prevents the bait from interfering with the other or with the proper operation of the hook. Through the two eyes 4 is rove a loop 15 on the lower end of the fish-line 6, so that when the fish-line is pulled on a fish striking the hook the eyes will be drawn together by the loop and the barbs thus spread apart, so as to securely catch the fish on both hooks in a well-known manner.

To return the hooks to and set them in their proper position of rest, as shown in Fig. 1, I employ in coöperation with the loop 15 a light rubber cord or band 7, connecting the eye 4 of one hook with the lower arm of the other hook, which draws the hooks to their normal position of rest, the loop 5 serving as a stop to resist the tension of said rubber cord and determine the proper relative position of the hooks, while at the same time the rubber cord 7 will yield easily to permit said loop to spread the barbs and catch the fish.

The remarkable simplicity of this improvement is equaled only by its evident efficiency for the purpose.

Having thus described my invention, I claim as new and desire to secure by Letters Patent of the United States—

1. The combination with two fish-hooks having eyes and barbs, jointed medially together, of a loop running through both eyes, and a light rubber cord connecting the eye or upper arm of one hook with the lower arm of the other hook and normally drawing said loop taut to set the hooks in their normal position.

2. The combination of two fish-hooks having eyes and barbs jointed medially together, with a loop running through both eyes and a light spring connecting the two hooks, the spring pressing and the loop stopping the hooks in a position overlapping each other and the loop serving, when pulled, to draw the eyes together and thus separate the hooks with their barbs pointing outward.

In testimony whereof I have hereunto set my hand the 28th day of July, 1899.

CHARLES FREDRICKS.

In presence of—
DAVID G. RODE,
CLARENCE L. BURGER.